United States Patent [19]

Swan

[11] Patent Number: 5,690,220

[45] Date of Patent: Nov. 25, 1997

[54] PACKAGING ARRANGEMENT FOR DISPLAY AND STORAGE OF COMPACT DISKS

[76] Inventor: Raleigh Swan, S 77 W23660 S. Woods La., Big Bend, Wis. 53103

[21] Appl. No.: 732,162

[22] Filed: Oct. 16, 1996

[51] Int. Cl.⁶ ................................................. B65D 85/57
[52] U.S. Cl. ............... 206/308.1; 206/312; 206/387.13; 206/475; 206/775; 53/460; 281/31
[58] Field of Search ................... 206/308.1, 307, 206/309, 311, 312, 313, 232, 387.13, 472–475, 275; 53/460; 281/31

[56] References Cited

U.S. PATENT DOCUMENTS

| | | |
|---|---|---|
| 1,236,333 | 8/1917 | Mayhew .................. 206/311 |
| 3,172,687 | 3/1965 | Lawrence .................. 281/31 |
| 4,001,960 | 1/1977 | Holson .................. 281/31 |
| 4,004,689 | 1/1977 | Glasell .................. 206/387.13 |
| 4,549,658 | 10/1985 | Sfikas .................. 206/312 |
| 4,610,352 | 9/1986 | Howey et al. .................. 206/313 |
| 4,831,756 | 5/1989 | Huang et al. .................. 281/31 |
| 5,011,010 | 4/1991 | Francis et al. . |
| 5,048,681 | 9/1991 | Henkel . |
| 5,101,973 | 4/1992 | Martinez . |
| 5,154,284 | 10/1992 | Starkey . |
| 5,186,327 | 2/1993 | McCafferty et al. .................. 206/308.1 |
| 5,188,229 | 2/1993 | Bernstein . |
| 5,248,032 | 9/1993 | Sheu et al. . |
| 5,248,037 | 9/1993 | Kornberg et al. .................. 206/472 |
| 5,263,581 | 11/1993 | Rosen .................. 206/308.1 |
| 5,421,452 | 6/1995 | Hybiske . |
| 5,460,265 | 10/1995 | Kiolbasa . |
| 5,472,083 | 12/1995 | Robinson et al. . |
| 5,501,326 | 3/1996 | Shuhsiang . |

*Primary Examiner*—Jacob K. Akcun
*Assistant Examiner*—Luan K. Bui
*Attorney, Agent, or Firm*—Skarsten Law Offices S.C.

[57] ABSTRACT

A holder or packaging arrangement is provided for a compact disk or data storage disk. The packaging arrangement comprises a first pocket piece formed of clear plastic or other transparent material, and a second pocket piece formed of material such as non-woven fiber, the two pocket pieces being joined together along common edges to form a pocket sized to receive a compact disk. The arrangement further includes a panel of stiff material having an aperture formed therein, such as a hard cover of a book or binder for printed material associated with the compact disk. A sheet of heavy paper or like material is affixed to the back side of the panel, the pocket and compact disk being trapped between the panel and the paper so that the compact disk is viewable through the aperture and the transparent material of the first pocket piece. A portion of the second pocket piece comprises an anti-tampering strip, which is removable to provide a slot or opening through which the compact disk may be removed from and inserted into the packaging arrangement.

13 Claims, 2 Drawing Sheets

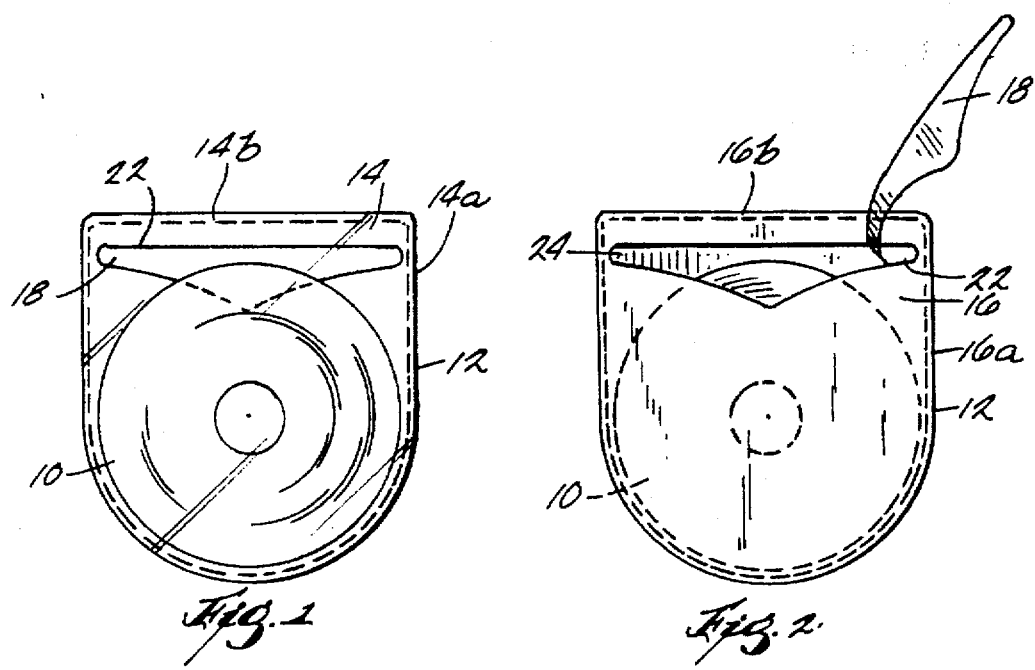
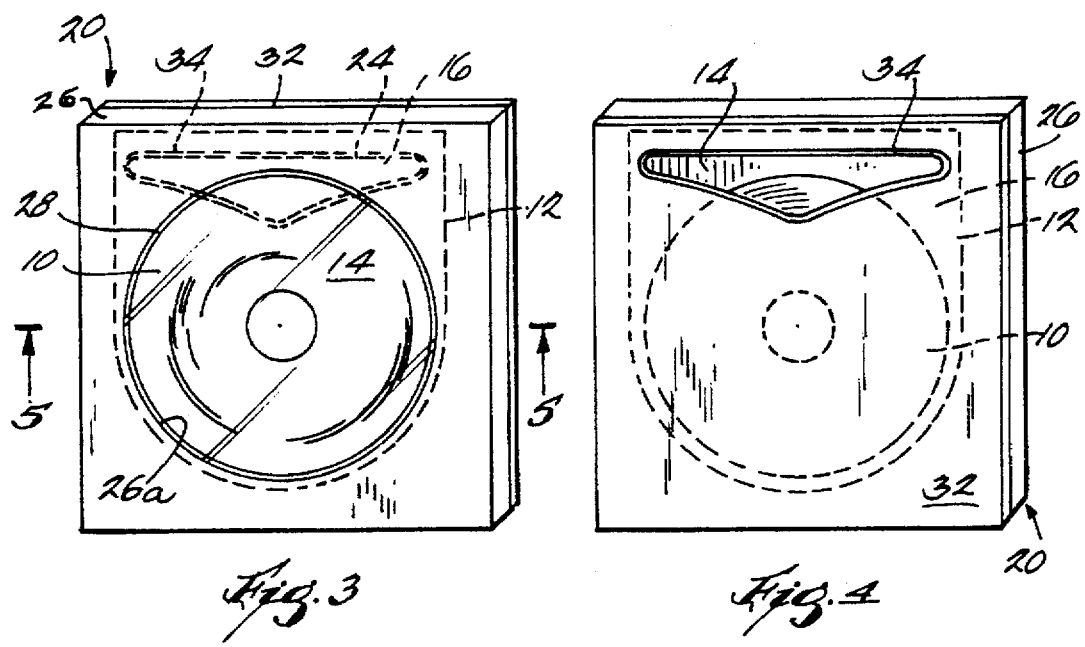
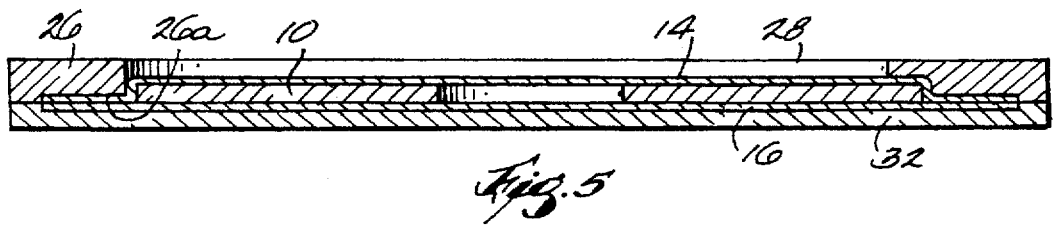

5,690,220

PACKAGING ARRANGEMENT FOR DISPLAY AND STORAGE OF COMPACT DISKS

BACKGROUND OF THE INVENTION

The invention disclosed and claimed herein generally pertains to an improved arrangement for storing or holding a compact disk (CD), other data containing disk, and like information storage media. More particularly, the invention pertains to an arrangement of the above type for achieving significant reductions in cost, bulk, and complexity over the prior art. Even more particularly, the invention pertains to an arrangement of the above type which employs a stiff panel, such as the hard cover of a book associated with a CD, as an integral component.

As is well known, compact disks, also known as laser records, are now widely used as information storage media. Compact disks were initially employed to store musical or other audio related information, and such use continues to be extremely important. In addition, compact disks are increasingly used with computers for read only memory (ROM) applications, to provide high density data storage. It is anticipated that the importance of compact disks will continue to grow as new applications are found for them, such as in the VCR area.

As is likewise well known, a variety of containers and packages are available in the prior art for use in the sale, transport, and storage of compact disks. One of the more widely used of such prior art containers, known as the "jewel box," comprises two plastic case sections which are hinged together. One of such containers, storing only a single CD, may have a thickness in excess of one-quarter inch. Thus, while such containers may be satisfactory for protecting a compact disk against scratching, bending, or the like, they tend to be comparatively expensive, bulky, and require a comparatively large amount of space to store only a few compact disks. Other prior art CD containers may be less expensive but provide insufficient protection, or may be complicated to manufacture.

SUMMARY OF THE INVENTION

The present invention is intended to provide certain improvements and advantages over prior art CD containers and packaging techniques. More particularly, the invention recognizes that there are a number of advantages in providing a CD packaging arrangement which includes a stiff, comparatively thin panel as a package component. Such panel could, for example, comprise the hard cover of a book, binder or the like, containing printed material associated with the compact disk. Thus, by means of such arrangement, the compact disk and the printed material can be kept together, such as for sale and storage, as part of a common package. As described hereinafter in further detail, the cover may be adapted to prominently display the disk, and the cover and pages provide support and protection therefor. Also, the CD could be fitted partially or entirely into an aperture formed in the cover. Thus, the CD would require little or no extra space. Other advantages and features of the invention are set forth hereinafter.

The CD packaging arrangement of the invention generally comprises a first pocket piece formed of transparent flexible material, and a second pocket piece formed of selected flexible material which is joined to the first pocket piece so that the two pocket pieces together form a pocket, sized to receive the compact disk. The arrangement further includes a panel of stiff material having an aperture formed therein, and means joined to the panel for forming a compartment to hold the pocket, as well as the CD when it is received thereinto. The pocket is positioned with respect to the aperture so that at least a portion of the CD, when received into the pocket, is viewable through the aperture and the transparent first pocket piece.

In a preferred embodiment, the second pocket piece is formed of a non-woven fabric material. A strip of such non-woven fabric is removable from the remainder thereof, to provide an opening for selectively inserting the CD into and removing the CD out of the pocket and the compartment. Preferably, the means joined to the panel comprises a sheet of heavy paper material joined thereto. A slot is provided through the paper material, the slot being aligned with the opening which is formed in the non-woven fabric by removal of the strip. In a useful embodiment, the stiff panel comprises the cover of a book, binder, or the like for printed material associated with the CD. However, the invention is not limited thereto.

OBJECTS OF THE INVENTION

An object of the invention is to provide an improved and comparatively simple packaging arrangement or container for a compact disk which significantly reduces cost and bulkiness in comparison with certain CD containers of the prior art.

Another object is to provide a CD packaging arrangement of the above type which employs the cover of a book or other printed material associated with the CD as a component.

Another object is to provide a CD packaging arrangement of the above type, wherein the CD is displayed upon the cover of the associated book, and at the same time is supported and protected thereby.

Another object is to provide a storage compartment for a CD which is integral to the cover of an associated book, wherein the CD may be readily removed from the compartment or inserted thereinto for storage.

Another object is to provide a CD storage compartment of the above type wherein the opening providing access to the compartment is sealed by means of an anti-tampering strip to discourage shoplifting of the CD or other interference therewith, when it is on sale in a publicly accessible location.

These and other objects of the invention will become more readily apparent from the ensuing specification, taken together with the accompanying drawings.

BRIEF DESCRIPTION OF THE DRAWINGS

FIG. 1 is a front view showing a component for an embodiment of the invention.

FIG. 2 is a rear view of the component shown in FIG. 1.

FIG. 3 is a front view showing a complete embodiment of the invention.

FIG. 4 is a rear view of the embodiment of FIG. 3.

FIG. 5 is a sectional view taken along lines 5—5 of FIG. 3.

DETAILED DESCRIPTION OF THE PREFERRED EMBODIMENT

Figure 6:
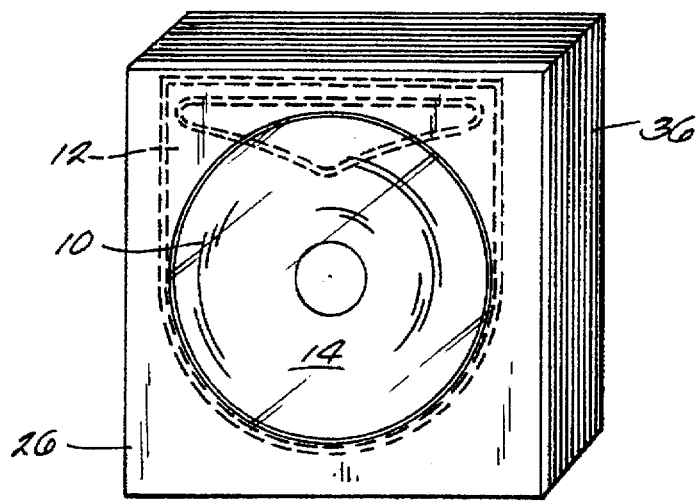
FIG. 6 is a perspective view showing a modification of the embodiment of FIG. 3, as viewed from the front.

Referring to FIGS. 1 and 2 together, there is shown a compact disk 10 contained in a pocket 12. Pocket 12 comprises pocket pieces 14 and 16, having edges 14a and 14b and 16a and 16b, respectively. Edges 14a and 16a match each other and are joined together by a suitable adhesive to form pocket 12. Edges 14b and 16b, along the top of pocket 12, likewise match each other and may be either joined together by the adhesive, or left unattached so that disk 10 may initially be inserted into pocket 12 therebetween. The lower portion of edges 14a and 16a, as viewed in FIGS. 1 and 2, generally follow or conform to the curvature of the compact disk 10.

Pocket piece 14 is formed of a transparent material such as clear plastic sheet material, with a thickness on the order of one ten-thousandth of an inch. Pocket piece 16 comprises a non-woven fabric. A narrow strip 18 of such fabric lies within a boundary 22, along which the fabric has been partially scored or cut. Thus, strip 18 can be readily removed from the remainder of the non-woven fabric to form an opening or slot 24 for the pocket piece 16. The opening 24 is sized with respect to CD 10 so that the CD can be readily removed from and inserted into pocket 12 through the opening 24.

In a useful embodiment of the invention described hereafter in further detail, the compact disk 10 initially is in place between the two pocket pieces 14 and 16 forming pocket 12. To allow CD 10 to be removed from pocket 12, strip 18 must first be torn or removed from pocket piece 16. Accordingly, strip 18 can function as an anti-tampering device as further described hereinafter.

Referring to FIG. 3, there is shown a complete CD packaging arrangement 20. More particularly, there is shown pocket 12 and compact disk 10 positioned with respect to a thin, comparatively stiff member 26, which is usefully formed of a material known in the bookbinding arts as chipboard. Such material is commonly used in making covers for books, binders, and the like. Panel 26, which has a thickness on the order of one-eighth inch, could alternatively be formed of cardboard or other material commonly used in such arts. Pocket 12 and compact disk 10 are positioned behind panel 26, as viewed in FIG. 3, so that compact disk 10 is aligned with a circular aperture 28 formed through panel 26. Preferably, the diameter of aperture 28 is slightly larger than the diameter of CD 10. The CD will thereby be viewable through aperture 28 and through the transparent plastic material comprising pocket piece 14. At the same time, the plastic material will protect CD 10 against scratching or like damage. Moreover, if panel 26 comprises the cover of a book, as described hereinafter in connection with FIG. 6, the CD 10 will be urged, at least partially, into the aperture 28 and be nested therein, when the book is closed. The plastic of pocket piece 14 can stretch slightly, if necessary, to accommodate such movement of CD 10.

Referring to FIGS. 4 and 5 together with FIG. 3, there is shown pocket 12 and compact disk 10 therein positioned in a compartment 30. Compartment 30 is formed by pasting or otherwise attaching a sheet of heavy paper 32 to the back of panel 26, i.e., the side thereof opposite the side viewed in FIG. 3. FIG. 4 further shows a slot 34 formed through paper material 32, which is of substantially the same dimensions as opening 24 through pocket piece 16, and is in alignment therewith. The slot 34 thus allows CD 10 to be removed from and inserted into pocket 12, after removal of strip 18 from pocket piece 16, as described above.

To fabricate the CD holder or packaging arrangement 20, comprising pocket 12, panel 26, and paper backing material 32, the compact disk 10 is placed in the pocket 12, either before or right after the pocket is formed. The pocket and disk are then positioned with respect to the panel 26 so that the compact disk 10 and aperture 28 are in concentric relationship. Such relationship is maintained by then attaching the paper 32 to the panel 26, so that the pocket 12 with CD 10 therein is effectively trapped between the paper 32 and the aperture edge portion 26a of panel 26, which surrounds the aperture 28.

It will be seen that packaging arrangement 20 comprises a very convenient and inexpensive CD holder or repository, which is very thin and therefore requires comparatively little storage space. The CD 10 can be readily removed from and inserted into the pocket 12 of compartment 30, after removal of the strip 18. As stated above, the CD 10 is very visible when contained in the packaging arrangement 20. Accordingly, such arrangement is very useful for displaying the CD to prospective purchasers, if the CD is on sale in a store. Moreover, by providing strip 18, the compact disk 10 cannot be removed from the packaging arrangement without handling thereof which would be likely to attract attention in a public place. Thus, provision of strip 18 tends to discourage shoplifting or other tampering with the compact disk when it is on sale or otherwise publicly accessible.

Figure 7:
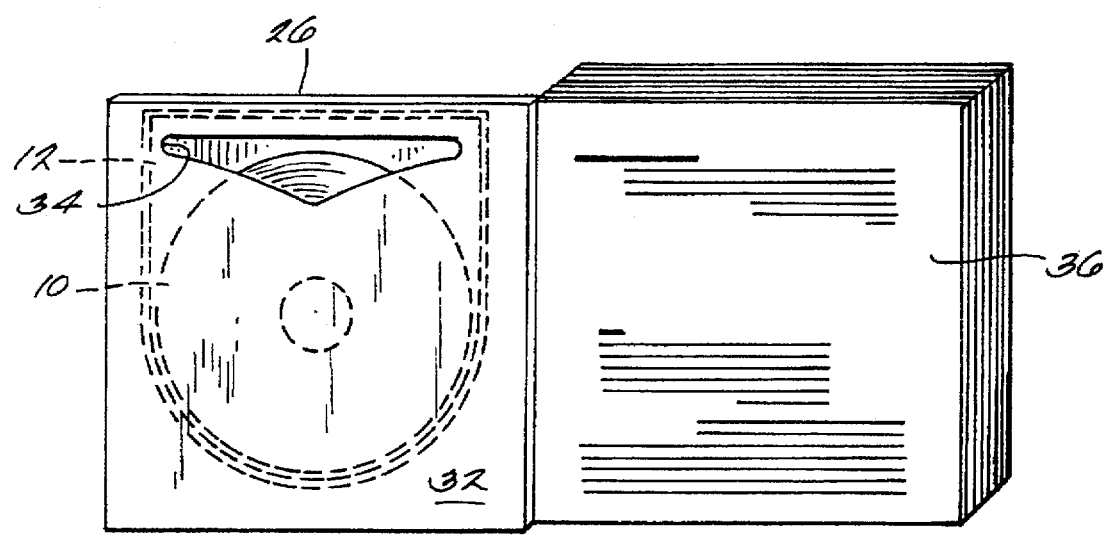
FIG. 7 is a rear view of the modification of FIG. 6.

Referring to FIGS. 6 and 7 together, there is shown a very useful embodiment of the invention, wherein the panel 26 comprises the from cover of a book 36. For example, compact disk 10 could comprise a CD ROM, and book 36 could contain computer-related information associated with the contents of the CD ROM. Alternatively, CD 10 could contain audio information, and the book 36 could contain associated visual information. It will be seen that the CD 10, when contained in the packaging arrangement 20, requires virtually no storage space other than the space which is needed for book 36. Also, the CD 10 is protected by positioning it between the front cover of book 36 and the respective pages thereof.

Obviously, many other modifications and variations of the present invention are possible in light of the above teachings. It is therefore to be understood that within the scope of the enclosed concept, the invention may be practice otherwise than as specifically described.

What is claimed is:

1. A packaging arrangement for a compact disk comprising:

first and second pocket pieces formed of selectively different materials joined together to form a pocket which is sized to receive said compact disk, said first pocket piece comprising a transparent material, and said second pocket piece comprising a selected non-woven fabric material;

a panel of stiff material having first and second opposing sides and having an aperture formed therein; and means joined to said first side of said panel for enclosing said pocket in a compartment, and for supporting said compact disk when received into said pocket so that at least a portion of said received disk is viewable through said aperture and said transparent first pocket piece from said second side of said panel.

2. A packaging arrangement for a compact disk comprising:

a first pocket piece comprising transparent flexible material;

a second pocket piece comprising selected non-woven fabric material joined to said first pocket piece to form a pocket which is sized to receive said compact disk, said second pocket piece being formed to define at least a portion of the boundary of an opening for selectively moving said compact disk into and out of said pocket;

a panel of stiff material having first and second opposing sides and having an aperture formed therein; and backing means joined to said first side of said panel for enclosing said pocket in a compartment, and for supporting said compact disk when received into said pocket so that at least a portion of said received disk is viewable through said aperture and said transparent first pocket piece from said second side of said panel, said backing means being provided with a slot at least partially aligned with said opening.

3. The arrangement of claim 2 wherein:

a portion of said second pocket piece comprises a strip lying within said boundary which is removable from the remainder of said second pocket piece to form said opening.

4. The arrangement of claim 3 wherein:

said backing means comprises a sheet of paper material attached to said first side of said panel.

5. The arrangement of claim 4 wherein:

said panel comprises chip board.

6. The arrangement of claim 5 wherein:

said first pocket piece comprises a clear plastic material.

7. The arrangement of claim 4 wherein:

said panel comprises a protective cover for printed material associated with said compact disk.

8. The arrangement of claim 4 wherein:

said panel comprises the front cover of a book associated with said compact disk.

9. A method for fabricating an arrangement for selectively holding a compact disk comprising the steps of:

forming a first pocket piece of transparent flexible material, and a second pocket piece of selected flexible material;

joining said pocket pieces together to form a pocket which encloses said compact disk;

forming an aperture of selected dimensions in a panel of stiff material;

placing said pocket and said compact disk in abutting relationship with said panel so that at least a portion of said disk is viewable through said aperture and said transparent first pocket piece; and applying a backing material to said panel to fix said pocket and said compact disk in said abutting relationship with said panel.

10. The method of claim 9 wherein:

said pocket piece comprises a selected non-woven fabric material.

11. The method of claim 10 wherein:

said second pocket piece is formed so that a portion thereof comprises a strip which is removable from the remainder of said second pocket piece to provide an opening for selectively moving said compact disk into and out of said pocket.

12. The method of claim 11 wherein:

said method includes the step of forming a slot in said backing material, said slot being aligned with said opening provided through said non-woven fabric.

13. The method of claim 12 wherein:

said panel comprises a protective cover for printed material associated with said compact disk.

* * * * *